(12) United States Patent
Saville et al.

(10) Patent No.: US 7,376,814 B1
(45) Date of Patent: May 20, 2008

(54) METHOD FOR FORMING VARIABLE LENGTH INSTRUCTIONS IN A PROCESSING SYSTEM

(75) Inventors: Winthrop L. Saville, Soquel, CA (US); Kevin Ross, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 905 days.

(21) Appl. No.: 09/391,647

(22) Filed: Sep. 7, 1999

(51) Int. Cl.
   *G06F 9/318* (2006.01)
(52) U.S. Cl. .................................... 712/210
(58) Field of Classification Search ......... 712/210, 712/209, 227
   See application file for complete search history.

(56) References Cited

U.S. PATENT DOCUMENTS

| | | | |
|---|---|---|---|
| 4,236,206 A | 11/1980 | Strecker et al. | |
| 4,363,091 A | 12/1982 | Pohlman, III et al. | |
| 4,454,578 A | 6/1984 | Matsumoto et al. | |
| 4,530,050 A | 7/1985 | Fukunaga et al. | |
| 4,586,130 A | 4/1986 | Butts, Jr. et al. | |
| 4,807,113 A | 2/1989 | Matsumoto et al. | |
| 5,109,495 A | 4/1992 | Fite et al. | |
| 5,220,656 A | 6/1993 | Itomitsu et al. | |
| 5,307,474 A * | 4/1994 | Sakamura et al. | 712/210 |
| 5,321,821 A | 6/1994 | Itomitsu et al. | |
| 5,500,942 A | 3/1996 | Eickemeyer et al. | |
| 5,745,722 A | 4/1998 | Matsumoto et al. | |
| 5,867,681 A * | 2/1999 | Worrell et al. | 712/210 |
| 5,878,267 A | 3/1999 | Hampapuram et al. | |
| 6,338,132 B1 * | 1/2002 | Kyker et al. | 712/210 |

FOREIGN PATENT DOCUMENTS

| | | |
|---|---|---|
| DE | 19826826 A | 7/1999 |
| EP | 0415461 A2 | 3/1991 |
| EP | 0843253 A1 | 11/1996 |
| WO | WO9319416 | 9/1993 |
| WO | WO97/22922 | 6/1997 |

OTHER PUBLICATIONS

Helbig et al., I.E.E.E. Trans. on Computers 38 Feb. 1989, No. 2, New York, NY US.

* cited by examiner

*Primary Examiner*—Richard Ellis
(74) *Attorney, Agent, or Firm*—Peter Zawilski

(57) ABSTRACT

Variable length instructions are formed for execution in a processing system. Each instruction includes a parameter portion having one or more of predetermined types of parameters and an opcode portion. The opcode portion specifies an operation to be performed, the number of parameters in the instruction, and definitive characteristics of the parameters. The parameters may represent data which is compressible, thereby enabling the size of parameters in an instruction to be reduced.

6 Claims, 5 Drawing Sheets

| Um_C (m = 32) | OPCODE | (e) (0)1010101 | (e) (0)1110000 | (e) (0)1100110 | 11110000 |
|---|---|---|---|---|---|

FIG. 3A Prior Art

OPCODE | 10011011

UmNC (m = 8)

FIG. 3B Prior Art (s)
OPCODE | (0)1101101

SmNC (m = 8)

FIG. 3C

(e)
OPCODE | (0)1010101 ∶ 11110000

(e) (e)
OPCODE | (1)1010101 | (1)1100110

Um_C, Um_C
(m = 16), (m = 16)

Um_C  
(m = 32)

| OPCODE | (e)<br>(0)1010101 | (e)<br>(0)1110000 | (e)<br>(0)1100110 | 11110000 |

| OPCODE | (e)<br>(0)1010101 | (e)<br>(0)1110000 | (e)<br>(1)1100110 |

| OPCODE | (e)(s)<br>(0)(0)010101 | 11110000 |

| OPCODE | (e)(s)<br>(1)(1)010101 |

FIG. 3H

Sm_C (m = 32) | OPCODE | (e)(s)(0)(0)010101 | (e)(0)110000 | (e)(0)1100110 | 11110000

FIG. 3I

Sm_C (m = 32) | OPCODE | (e)(s)(0)(1)010101 | (e)(0)110000 | (e)(1)1100110

FIG. 3J

Um_C (m = 32) | OPCODE | (e)(1)1010101

FIG. 3K

Um_C (m = 32) | OPCODE | (e)(0)1010101 | 00011100 | 11001100 | 11110000

FIG. 3L

METHOD FOR FORMING VARIABLE LENGTH INSTRUCTIONS IN A PROCESSING SYSTEM

BACKGROUND OF THE INVENTION

1. Field of the Invention

The invention relates to the formation of instructions in a processing system and, in particular, to the formation of variable-length instructions.

2. Description of Related Art

The manipulation of data in a processing system is achieved by the use of instructions, each including an opcode portion and a parameter portion. The opcode portion specifies an operation to be performed by a processor in the system and the parameter portion includes one or more parameters representing data such as addresses for locating data in a memory and/or numbers to be manipulated by the processor.

In any instruction including one or more parameters representing an address, the total bit length must be large enough to represent the largest-possible address value. A common technique for reducing this bit length is to use address indexing, whereby a variety of instructions with different length address parameters are provided. For example, a variety of JUMP instructions with different length offset parameters and requiring different numbers of bytes may be provided.

Similarly, in any instruction including one or more parameters representing numbers to be manipulated by the processor, the total bit length must be large enough to represent the largest possible values of the numbers. Typically, a processing system has a variety of memories (registers, ROM, RAM etc.) of differing bit-length capacities and is capable of moving numbers of a variety of different bit lengths. In order to facilitate this, it is common practice to provide a different MOVE instruction for each possible combination of bit lengths. For example, even in the situation where all memory capacities are identical (e.g. a thirty-two bit capacity), four different MOVE instructions might be required, i.e.:

- a first MOVE instruction for moving an eight-bit number to a thirty-two-bit-capacity memory location;
- a second MOVE instruction for moving a sixteen-bit number to a thirty-two-bit-capacity memory location;
- a third MOVE instruction for moving a twenty-four-bit number to a thirty-two-bit-capacity memory location; and
- a fourth MOVE instruction for moving a thirty-two-bit number to a thirty-two-bit-capacity memory location.

In the first three examples, the processor will automatically expand the moved word to a thirty-two-bit value.

SUMMARY OF THE INVENTION

It is an object of the invention to reduce the memory space needed for a program. This is achieved by compressing parameters without increasing the number of opcodes.

In accordance with the invention a method of forming instructions for execution in a processing system comprises:
- providing an opcode portion determining at least one operation to be performed by the processor; and
- providing a compressible parameter portion including at least one parameter representing a respective data value, the parameter portion including an expansion indicator representing the state of compression of the at least one parameter.

Note that the word "memory", as used herein, is intended to be interpreted as generally as is consistent with the manner in which it is used and includes volatile and non-volatile devices of various types including, without limitation, RAMs, DRAMs, ROMs, registers and combinations of such devices. Also, as used herein, the word "pointer" means any value that identifies a memory location. Additionally, "accessing" data means obtaining data from, or placing data into, a memory.

BRIEF DESCRIPTION OF THE DRAWING

FIGS. 3A through 3L illustrate exemplary instructions utilized in explaining the invention.

DESCRIPTION OF THE PREFERRED EMBODIMENTS

Figure 1:
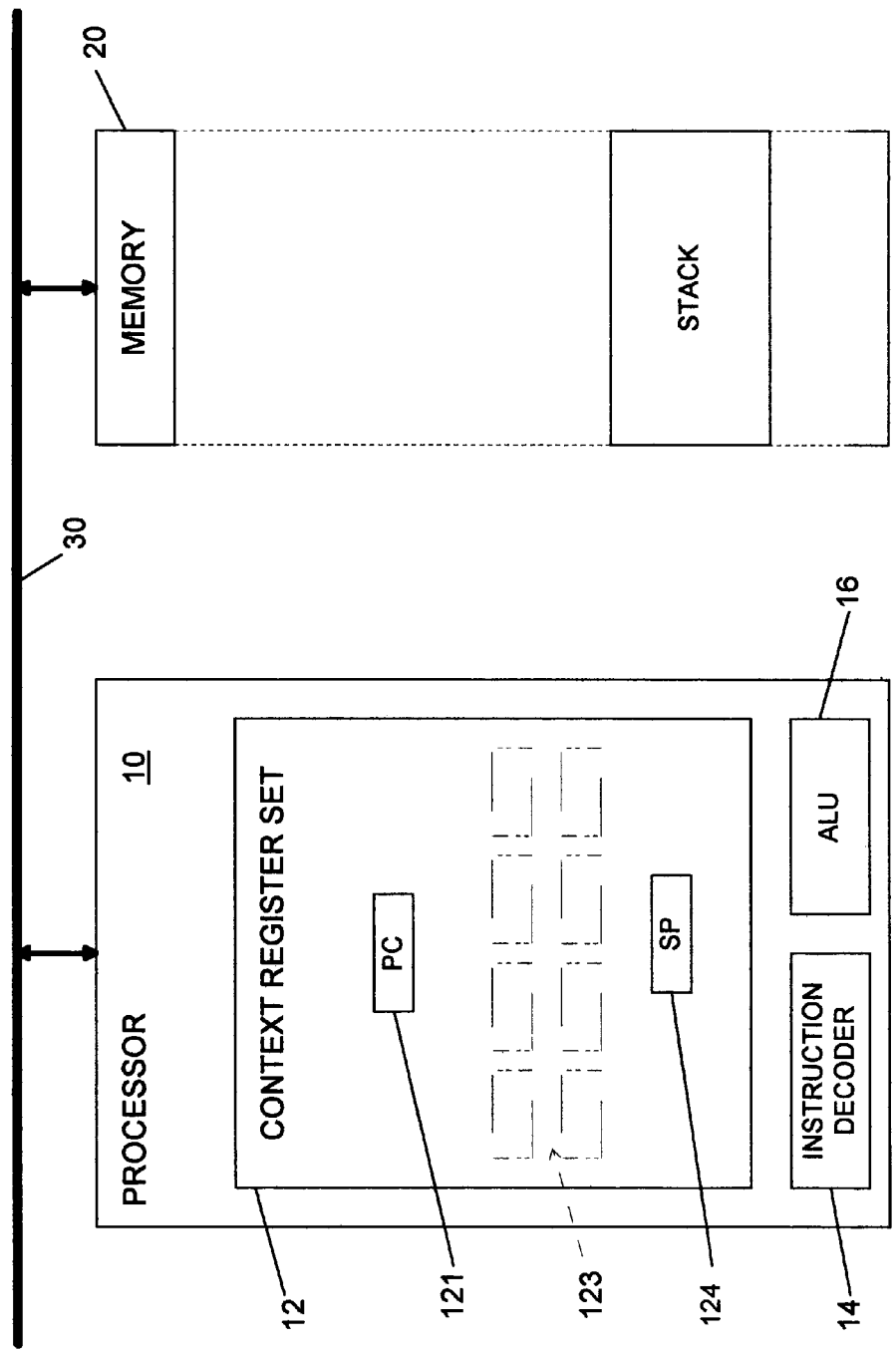
FIG. 1 is a block diagram illustrating an exemplary processing system that is useful in explaining preferred embodiments of the invention.

The processing system of FIG. 1 includes a processor 10 and a memory 20. The exemplary processor 10 is a hardware-accelerated unit which utilizes clock pulses to sequence through instructions identified by a program counter register. Typically, the program counter register contains the memory location of the next instruction to be read and acted upon by the processor.

The processor includes, inter alia, a context register set 12, an instruction decoder 14 and an arithmetic logic unit 16. The memory 20, in this exemplary embodiment, comprises a RAM having a multiplicity of memory locations for storing, inter alia, data and/or systems variables and for serving as a LIFO stack for facilitating performance of program methods and/or procedures.

The processor 10 and the memory 20 are connected to a common bus 30 for communicating with each other and with other hardware that is connected to the bus. The bus includes respective lines for carrying data such as addresses, interrupts, data, read strobes, write strobes and device-select strobes. Preferably, this is a high-speed bus which is at least partially formed on a common silicon substrate with the processor and the memory.

The context register set 12 includes a program counter register 121, one or more general purpose registers 123, and a register 124 that is utilized for addressing the stack. More specifically, the registers in the context register set include:
- the program counter register 121 which holds a continually-updated Program Count PC for identifying the next memory address to be accessed by the processor;
- general purpose registers 123 for containing data which is either read from the memory 20 or produced by the arithmetic logic unit 16;
- register 124 for holding a stack pointer SP identifying the location in memory of the current stack address being accessed.

The instruction decoder 14 is a conventional hardware component, such as a sequencer or micro-sequencer, for converting instructions read from the memory 20 to lower-level operation codes. The arithmetic logic unit 16 is also a conventional hardware component.

At least some of the instructions executable by the processor include a parameter portion and an opcode portion in accordance with the invention. The parameter portion may include one of the following types of parameters for representing data to be utilized by the processor:

UmNC is a parameter representing data which is unsigned (U), not compressed (NC) and has a total bit length of m bits;

SmNC is a parameter representing data which is signed (S), not compressed (NC) and has a total bit length of m bits;

Um_C is a parameter representing data which is unsigned (U), compressible (_C) and has a total bit length of m bits;

Sm_C is a parameter representing data which is signed (S), compressible (_C) and has a total bit length of m bits.

Note that parameter types UmNC and SmNC are well known, but are included to illustrate backward compatibility of the invention. Note further that, in every case m represents the total number of bits in the final, uncompressed data represented by a respective parameter. Also each parameter formed in accordance with the invention includes one or more bytes of predetermined bit length. In the exemplary embodiments described, each byte has a length of eight bits.

Figure 2A:
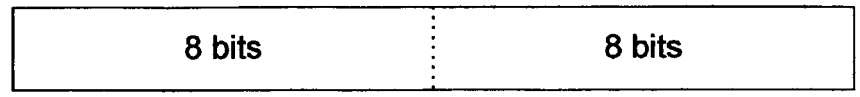
FIGS. 2A through 2D illustrate exemplary parameters utilized in explaining the invention.
Figure 2B:
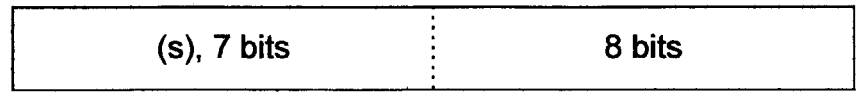

FIGS. 2A and 2B show exemplary formats for parameters of each of the respective types UmNC, SmNC. In these examples, each of the parameters comprises two bytes. Specifically:

FIG. 2A shows a two-byte parameter of type UmNC representing an unsigned data value which is not compressed and has a total bit length of 16 bits (m=16). In this example, each byte of the parameter is equivalent to a corresponding byte of the data that it represents.

FIG. 2B shows a two-byte parameter of type SmNC representing a signed data value which is not compressed and has a total bit length of sixteen bits (m=16). In this example, each byte of the parameter is again equivalent to a corresponding byte of the data that it represents, but the first bit of the data value is a sign bit s.

Figure 2C:
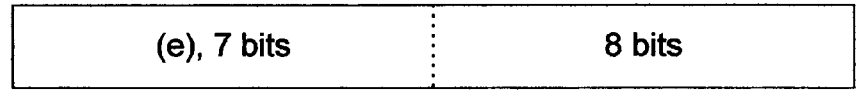

FIG. 2C shows a two-byte parameter of type Um_C representing an unsigned, compressible data value having a total bit length of sixteen bits (m=16), but which may be greater than the bit length of the parameter itself, depending on whether the data has been compressed. This is indicated by an expansion bit e in the first byte of the parameter. The value of e determines whether the processor expands the first byte of the parameter to the full sixteen-bit size of the data value or reads a second byte from memory.

Figure 2D:
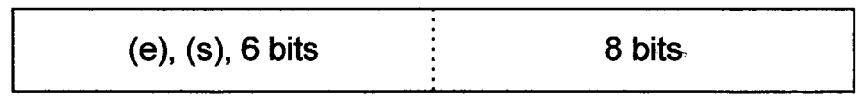

FIG. 2D shows a parameter of type Sm_C representing a signed, compressible data value having a total bit length of sixteen bits (m=16), but which again may be greater than the bit length of the parameter itself, depending on whether the data has been compressed. Again, this is indicated by an expansion bit e contained in the first byte of the parameter and having a value which determines whether the processor expands the first byte of the parameter to the full sixteen-bit size of the data value or reads a second byte from memory. The second bit is the sign bit s.

In each instruction which includes one or more of the parameter types UmNC, SmNC, Um_C, Sm_C, the specific opcode determines:

the operation or operations to be performed by the processor;

the number of such parameters in the instruction;

definitive characteristics of each of the parameters, including:

whether the parameter represents data that is compressible;

the uncompressed length m of the data represented by the parameter;

whether the parameter is signed (includes a sign) or unsigned (does not include a sign).

For multi-byte parameters, the order in which the bytes are read and arranged by the processor to form the parameters must also be determined. This may be done in a variety of ways, such as by including this order in the definition of the specific instructions with which the respective parameters are associated, by defining a fixed order of parameter arrangement for the specific processor, by including in the parameters themselves codes specifying the order of arrangement, etc.

Preferably the opcode portion of the instruction is formatted to inherently specify the number of parameters and their characteristics. For example, an opcode for an ADD instruction, where the ALU 16 adds an operand A to an operand B and where the sum is stored in an address C, would include three parameters—one for each of the operands A and B, and address C. Note that, for example, A and B may have values that are compressible and C may be an index from a base address, which is potentially a compressible number. Further, the definition of the instruction itself will specify the pertinent characteristics of each of these parameters. As another example, an opcode for an ENTER instruction, where the processor 10 is to decrement the stack pointer value SP in register 124 to an address in the stack that will provide memory space represented by a value M, would include the single unsigned parameter M. The size of M may be compressed, as this is an index to the current address located by SP. The definition of the instruction itself will also specify the other pertinent characteristics of the parameter M.

The processor 10 forms each instruction byte-by-byte by accessing memory addresses indicated by the continually-updating program counter PC. Preferably these addresses point to locations in a quick-access memory, such as a cache memory (not shown) in the processor itself. First, the processor reads the opcode and then the number of parameters defined by the specific opcode. FIGS. 3A through 3J illustrate representative examples of how this is done for different types of parameters. Each instruction includes an opcode portion followed by a parameter portion containing one or more parameters. Specifically:

FIG. 3A shows an instruction having a single one-byte parameter of type UmNC. In this example, m=8 and the eight-bit parameter is identical to the data value that it represents.

FIG. 3B shows an instruction having a single one-byte parameter of type SmNC. In this example, m=8 and the eight-bit parameter includes a sign bit s=0 and is identical to the data value that it represents.

FIG. 3C shows an instruction having a single two-byte parameter of type Um_C. In this example, m=16 and the first byte of the parameter includes an expansion bit value e=0, indicating that the first byte is not compressed. Thus the processor must read one more byte to form the complete sixteen-bit parameter.

FIG. 3D shows an instruction having two single-byte parameters of type Um_C. For each parameter, m=16 and the first bit is an expansion bit having the value e=1. This tells the processor 10 to expand each parameter to the full sixteen bit data value represented by the parameter. This may be done by whatever decompression technique has been associated with the specific opcode for this instruction. For example, if one of the parameters represents an index value that will be written into a sixteen-bit register, but its maximum value can be formed with seven or fewer bits, the parameter can be expanded to sixteen bits by discarding the expansion bit and inserting nine bits of predetermined value (e.g. nine zeroes) in front of the remaining seven bits. Alternatively, the eight-bit parameters can be expanded to the full sixteen bits by decompression algorithms associated with the specific opcode.

FIG. 3E shows an instruction having a single four-byte parameter of type Um_C. In this example, m=32, and the first three bytes each include an expansion bit value e=0. The processor reads and discards the three expansion bit values, reads the seven data bits from each of the first three bytes, reads the eight data bits from the fourth byte, and inserts three bits of predetermined value (e.g. three zeroes) in front of the remaining twenty-nine bits, to expand the parameter to thirty-two bits.

FIG. 3F shows an instruction having a single three-byte parameter of type Um_C. In this example, m=32, the first two bytes each include an expansion bit value e=0, and the third byte includes an expansion bit value e=1. The processor reads the seven data bits from each of the three bytes, reads and discards the three expansion bit values, and then inserts eleven bits of predetermined value (one for each of the discarded expansion bits and eight in response to the expansion bit having the value e=1) in front of the remaining twenty-one bits, to expand the parameter to thirty-two bits. If the expansion is achieved by filling the missing bits of the completed data value with zeroes, the processor will insert eleven bits with these values in front of the twenty one data bits provided by the three-byte parameter. Note, that in a preferred form of the invention, the parameter bytes are stored in, and read from, memory in reverse order, i.e. from least significant byte to most-significant byte. Thus, in the example of FIG. 3F:

the first byte of the parameter read forms the least-significant seven bits of the data value [1010101];

the second byte of the parameter read forms the next-most-significant seven bits of the data value [1110000];

the third byte of the parameter read forms the most-significant seven bits of the data value [1100110]; and the eleven zeroes are inserted in front of the last-read third byte of the parameter to form the complete data value [00000000000110011011100001010101].

FIG. 3G shows an instruction having a single two-byte parameter of type Sm_C. In this example, m=16, the first byte includes an expansion bit value e=0 and a sign bit value s=0. Thus, the processor reads the two bytes and inserts one bit of predetermined value between the sign bit and the remaining fourteen data bits read. In the interest of simplicity, preferably this predetermined value is the same as that of the sign bit.

FIG. 3H shows an instruction having a single one-byte parameter of type Sm_C. In this example, m=16, the single byte includes an expansion bit value e=1 and a sign bit value s=1. Thus, the processor reads the single byte and inserts nine bits of predetermined value (e.g. that of the sign bit) between the sign bit and the remaining six data bits read.

FIG. 3I shows an instruction having a single four-byte parameter of type Sm_C. In this example, m=32, the first byte includes an expansion bit value e=0 and a sign bit value s=0, each of the second and third bytes includes an expansion bit value e=0, and the fourth byte includes the remaining eight bits of the data value. Thus, the processor reads the four bytes and inserts three bits of predetermined value, e.g. that of the sign bit, between the sign bit and the remaining twenty-eight data bits read.

FIG. 3J shows an instruction having a single three-byte parameter of type Sm_C. In this example, m=32, the first byte includes an expansion bit value e=0 and a sign bit value s=1, the third byte includes an expansion bit value e=1. Thus, the processor reads the first two bytes without change and expands the third byte by eight bits to form the full thirty-two-bit data value represented by the parameter.

In the above examples, each parameter is read byte-by-byte and a decision of whether to expand the parameter is determined by reading an expansion field in each byte. The space occupied by the expansion field decreases the total addressable range. As an alternative, an expansion field may be included in only the first byte of a parameter. In this case, the parameter will always be stored in either a compressed single byte form or in an expanded form.

FIGS. 3K and 3L illustrate representative examples of how this may be done within fields of the parameters. Each of these figures illustrates an example of a parameter representing a thirty-two bit data value. The first byte following the opcode contains a bit field comprising a single expansion bit e. The value of the expansion bit indicates which of two possible situations exist. That is, either the parameter portion contains only a single compressed parameter that must be expanded to thirty-two bits or it contains four bytes representing an expanded thirty-two bit data value.

Referring to FIGS. 3K and 3L:

FIG. 3K shows an instruction having a single parameter of type Um_C. In this example, m=32 and the first (and only) byte of the parameter includes an expansion bit value e=1. This tells the processor to expand the parameter to the full thirty-two bit data value represented by the parameter.

FIG. 3L also shows an instruction having a single parameter of type Um_C. In this example, again m=32 but the first (of four) bytes of the parameter includes an expansion bit value e=0. This tells the processor to read three more bytes to form the full data value.

Although specific embodiments of the invention have been described, many alternatives are possible within the scope of the invention. For example, rather than inherently specifying in opcodes the number of associated parameters, bit fields within the parameters themselves can be utilized to indicate this and a variety of other parameter-related characteristics including:

the number of bits m in a data value represented by a parameter;

the number of bytes in a parameter;

whether a parameter represents a compressed data value.

What is claimed is:

1. A method of forming instructions for execution in a processing system, said method comprising:

providing an opcode portion determining at least one instruction to be performed by the processing system; and providing a first parameter byte including a first set of data value bits, and a first expansion bit indicative of whether the processing system expands the first set of data value bits or reads any additional parameter bytes including additional sets of data value bits.

2. The method of claim 1, wherein said first byte further has a sign bit indicative of whether the first set of data value bits represents a positive number or a negative number.

3. The method of claim 1, further comprising providing a second parameter byte including a second set of data value bits, and a second expansion bit indicative of whether the processing system expands the second set of data value bits or reads any additional parameter bytes including additional sets of data value bits.

4. The method of claim 3, wherein said first byte further has a sign bit indicative of whether the first set of data value bits and the second set of data value bits collectively represent a positive number or a negative number.

5. The method of claim 3, further comprising providing a third parameter byte including a third set of data value bits, and a third expansion bit indicative of whether the processing system expands the third set of data value bits or reads any additional parameter bytes including additional sets of data value bits.

6. The method of claim 5, wherein said first byte further has a sign bit indicative of whether the first set of data value bits, the second set of data value bits and the third set of data value bits collectively represent a positive number or a negative number.

\* \* \* \* \*